Patented Oct. 7, 1952

2,613,214

UNITED STATES PATENT OFFICE 2,613,214

SYNTHESIS OF CHLOROMETHYLATED HALOALKYL THIOPHENES

Herman Pines, Chicago, Ill., assignor to Universal Oil Products Company, Chicago, Ill., a corporation of Delaware No Drawing. Application December 28, 1946, Serial No. 719,127

7 Claims. (Cl. 260—332.5)

This invention relates to a process for preparing chloromethylated haloalkyl and halocycloalkylthiophenes.

An object of this invention is to form a chloromethylated derivative of a haloalkylthiophene in which the haloalkyl group contains at least two carbon atoms.

Another object of this invention is to form a chloromethylated derivative of a haloalkylthiophene in which the haloalkyl group contains at least two carbons and the halogen atom is combined with a carbon atom other than the carbon atom attached to the thiophene ring.

Another object of this invention is to form a chloromethylated derivative of a halocycloalkylthiophene in which the halogen atom of the halocycloalkyl group is combined with a carbon atom other than the carbon atom attached to the thiophene ring.

A further object of this invention is to form a chloromethylated β-haloalkylthiophene.

A still further object of this invention is to form a 2-(β-chloroalkyl)-5-chloromethylthiophene.

Another object of this invention is to produce 2-(chlorotertiary butyl)-5-chloromethylthiophene.

One specific embodiment of this invention relates to a process which comprises reacting a haloalkylthiophene having at least one replaceable nuclear hydrogen atom and at least two carbon atoms in the haloalkyl group, hydrogen chloride, and a member of the group consisting of formaldehyde, meta-formaldehyde, and paraformaldehyde.

Another embodiment of this invention relates to a process which comprises reacting a halocycloalkylthiophene having at least one replaceable nuclear hydrogen atom and at least two carbon atoms in the halocycloalkyl group, hydrogen chloride, and a member of the group consisting of formaldehyde, metaformaldehyde, and paraformaldehyde in the presence of an acid-acting catalyst.

A further embodiment of this invention relates to a process which comprises reacting a halocycloalkylthiophene having at least one replaceable nuclear hydrogen atom and at least two carbon atoms in the halocycloalkyl group, hydrogen chloride, and a member of the group consisting of formaldehyde, metaformaldehyde, and paraformaldehyde in the presence of a metal halide catalyst.

I have found that chloromethylated haloalkyl and halocycloalkylthiophenes may be prepared by reacting a haloalkyl or halocycloalkylthiophene with formaldehyde or a polymer thereof in the presence of hydrochloric acid. The haloalkyl or halocycloalkylthiophene to be chloromethylated has at least one replaceable nuclear hydrogen atom and also has at least one hydrogen atom of the thiophene ring substituted by a halocycloalkyl group or a haloalkyl group containing at least two carbon atoms. While any of the halogens, namely, fluorine, chlorine, bromine, and iodine may be present in said haloalkyl or halocycloalkyl group, chlorine is the preferred halogen, because of cost consideration and other factors, particularly the convenience of working in steel or glass equipment, as such operations are more difficult when fluorine is contained in the charging stock.

The chloromethylatable haloalkyl or halocycloalkylthiophenes which are employed in my process may be represented by the following formula:

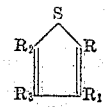

in which at least one of the R groups and preferably R or $R_2$ is a hydrogen atom; at least another of the R groups is a haloalkyl, halocycloalkyl, haloaralkyl, haloalkaryl, etc. group; and the remaining R groups are selected from the member of the group consisting of a hydrogen atom, a halogen atom, an alkyl group, a cycloalkyl group, an aralkyl, an alkaryl group etc.

As another constituent of the reaction mixture, formaldehyde can be used in solution in the form of commercial aqueous formaldehyde containing 37% HCHO or in the form of polymers such as trioxy-methylene (sometimes also called metaformaldehyde) and paraformaldehyde. The molar ratio of HCHO to thiophene charged to the process is generally from about 0.5 to about 2.

While catalysts are not essential to the operation of this process, the chloromethylation reaction is sometimes facilitated by the presence of acid-acting catalysts including mineral acids and metal halides. Of the mineral acids, sulfuric acid, and phosphoric acid, and hydrofluoric acid are particularly effective while the preferred metal halides include aluminum chloride, bismuth chloride, zirconium chloride, stannic chloride, zinc chloride, and boron trifluoride. Activated clays which are acid-acting may also be used as catalyst in this chloromethylation process.

The temperature employed for effecting the reaction is from about −30° to about 200° C. and preferably from about −20° to about 100° C. The particular temperature used in a given chloromethylation treatment depends upon the reactivity of the thiophene compound charged, the nature of the catalyst, if any, and the form of the aldehydic compound charged to the process, that is, whether formaldehyde or a polymer thereof is used. The reactor is also maintained at a pressure sufficient to keep a substantial proportion of the reactants in liquid phase.

The chloromethylated haloalkyl and halocycloalkylthiophenes which are formed by my process are useful as intermediates in organic synthesis and in the production of medicinals, plastics, resins, insecticides, etc.

The process of my invention is illustrated by the following equation which shows the formation of the new compound, 2-chloro-methyl-5-(chloro-tertiary-butyl)-thiophene by the action of hydrogen chloride and formaldehyde on 2-chloro-tertiary-butyl thiophene also sometimes referred to as 2-methyl-2-thienylchloropropane.

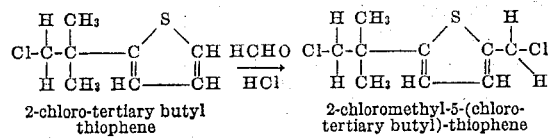

2-chloro-tertiary butyl thiophene     2-chloromethyl-5-(chloro-tertiary butyl)-thiophene Other haloalkylthiophenes in which the halogen atom is attached to the $\beta$, $\gamma$, $\delta$, etc. carbon atom of the haloalkyl group may be chloromethylated as illustrated by the following equation:

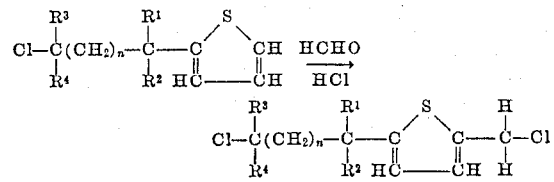

in which each of the R's represents a hydrogen atom or an alkyl group and $n$ represents zero or a small whole number. The R's may also represent cycloalkyl, aryl, aralkyl, and alkaryl groups, and two of the R's together may represent a polymethylene ring. These different halogenated derivatives of thiophene have the halogen atom combined with a carbon atom of the side chain other than the carbon atom bound to the thiophene ring.

My process for effecting the chloromethylation of a haloalkyl or halocycloalkyl thiophene is carried out in either batch or continuous types of operation. In batch-type treatment, a haloalkyl, or halocycloalkylthiophene, formaldehyde, a polymer thereof, and hydrochloric acid are contacted in an autoclave or other suitable equipment in which the temperature may be controlled by internal or external heating or cooling. Such an autoclave is usually provided with a stirrer or other means of agitation in order to effect intimate contact of the different constituents of the reaction mixture. The hydrogen chloride is charged in molar excess to the amount of HCHO introduced to the reaction zone. After the chloromethylation reaction has reached the desired degree of completion, the resultant reaction products are then discharged from the batch-type reactors and separated by suitable means, as by distillation at subatmospheric pressure, and unconverted or incompletely converted reactants are added to the materials charged in a later run.

Continuous chloromethylation treatment which is usually preferred over batch-type operation may be carried out by continuously introducing a haloalkyl or halocycloalkylthiophene, formaldehyde, or a polymer thereof, and hydrochloric acid to a suitable reactor containing baffles or granular packing material upon which a metal halide catalyst or other acid-acting catalyst is supported. The reactants are thus charged to the reaction zone at rates suitable to effect the desired degree of chloromethylation of the charged halothiophene. Although one chloromethyl group is usually added to a haloalkylthiophene or halocycloalkylthiophene by my process, it is also possible to add two or more chloromethyl groups to the charged thiophene compound by making suitable modifications in the operating temperature, rate of charge of the reaction mixture, nature of catalyst, etc.

The following example is introduced to illustrate the process of my invention but it should not be construed to limit unduly the generally broad scope.

75 grams of hydrochloric acid containing 37% by weight of HCl and 5.9 grams of trioxymethylene were stirred in a glass reactor of 250 cc. capacity until the trioxymethylene had dissolved in the hydrochloric acid. This solution was then maintained at a temperature of from 20° to about 50° C. while 26.2 grams of 2-(chloro-tertiary-butyl)-thiophene was added dropwise during 0.5 hour. The stirring of the reaction mixture was then continued for an additional time of 2 hours. The reaction mixture was then separated and the oil layer was washed, dried, and distilled to give fractions with the properties shown in the following table.

| Fraction No. | Temp., °C. | Pressure, mm. | Grams | $n_D^{20}$ |
|---|---|---|---|---|
| 1 | 60–70 | 1.5 | 2.7 | 1.5339 |
| 2 | 70–105 | 1.5 | 0.9 | 1.5493 |
| 3–4 | 105–109 | 1.5 | 17.3 | 1.5571 |
| 5 | 109–153 | 1.5 | 4.8 | 1.5573 |
| 6–7 | 115–153 | 1.5 | 3.2 | 1.5748 |
| Residue | | | 2.7 | |

The product separated in fractions 3 to 5 was an almost colorless liquid consisting of 2-(chloro-tertiary-butyl)-5-chloro-methylthiophene which was obtained in a yield of 88.5% based upon recycle operation or a yield of 81% based upon the 2-(chloro-tertiary-butyl)-thiophene charged. In addition 7% of the 2-(chloro-tertiary-butyl)-thiophene was converted into its dichloromethyl derivative.

The nature of the present invention and results obtained thereby are evident from the preceding specification and example, although neither section should be misconstrued to limit unduly the generally broad scope of the invention.

I claim as my invention:

1. A haloalkyl-chloromethyl-thiophene in which the haloalkyl group contains at least two carbon atoms and the halogen atom is combined with a carbon atom of said haloalkyl group other than the carbon atom attached to the thiophene ring.

2. A chloromethyl-thiophene having attached to a carbon atom in the thiophene nucleus a halogenated saturated hydrocarbon radical of at least two carbon atoms and in which the halogen atom is attached to a carbon atom other than the carbon atom attached to the thiophene nucleus.

3. Thiophene having a chloromethyl group attached to one of the carbon atoms of the thiophene nucleus and having attached to another of said carbon atoms a chloroalkyl group containing at least two carbon atoms and in which the chlorine atom is attached to a carbon atom other than the carbon atom attached to the thiophene nucleus.

4. Thiophene having a chloromethyl group attached to one of the carbon atoms of the thiophene nucleus and having attached to another of said carbon atoms a chlorinated saturated hydrocarbon radical of at least two carbon atoms and in which the chlorine atom is attached to a carbon atom other than the carbon atom attached to the thiophene nucleus.

5. 5-chloromethylthiophene having at the 2-position of the thiophene nucleus a chloroalkyl substituent containing at least two carbon atoms and in which the chlorine atom is attached to a carbon atom other than the carbon atom attached to the thiophene nucleus.

6. A compound as defined in claim 5 further characterized in that said substituent contains four carbon atoms.

7. 2 - (chloro - tertiary-butyl) -5-chloromethylthiophene.

HERMAN PINES.

REFERENCES CITED

The following references are of record in the file of this patent:

UNITED STATES PATENTS

| Number | Name | Date |
| --- | --- | --- |
| 2,425,721 | Blicke | Aug. 19, 1947 |

OTHER REFERENCES

"Organic Reactions," vol. 1, pp. 64 and 66, John Wiley and Sons, Inc., New York, 1942.

Chemical Abstracts 37:95-2 (1943).

Richter: "Organic Chemistry," pp. 649 and 650, John Wiley and Sons, Inc., 1938.

Whitmore: "Organic Chemistry," Van Nostrand, New York, 1937, p, 893.

Blicke: J. Am. Chem. Soc. 64, 478 (1942).

Steinkopf: Ann. 532, 277, 279, 281 (1937).